United States Patent
Kalyan et al.

(10) Patent No.: US 8,321,204 B2
(45) Date of Patent: Nov. 27, 2012

(54) AUTOMATIC LEXICON GENERATION SYSTEM FOR DETECTION OF SUSPICIOUS E-MAILS FROM A MAIL ARCHIVE

(75) Inventors: Malathi Kalyan, Bangalore (IN); Abhi Dattasharma, West Bengal (IN); Ram Lokendar Singh, Bangalore (IN); Sanjay Subhash Panakkal, Bangalore (IN); Dinesh Rama Hedge, Bangalore (IN); Vinay Manjunath Naik, Bangalore (IN)

(73) Assignee: Saraansh Software Solutions PVt. Ltd.

( * ) Notice: Subject to any disclaimer, the term of this patent is extended or adjusted under 35 U.S.C. 154(b) by 902 days.

(21) Appl. No.: 12/404,770

(22) Filed: Mar. 16, 2009

(65) Prior Publication Data

US 2010/0057720 A1    Mar. 4, 2010

(51) Int. Cl.
*G06F 17/21* (2006.01)
*G06F 7/04* (2006.01)
*G06F 7/00* (2006.01)

(52) U.S. Cl. ............ 704/10; 726/26; 707/741; 707/750; 707/754; 707/755

(58) Field of Classification Search .......................... None
See application file for complete search history.

(56) References Cited

U.S. PATENT DOCUMENTS

| | | | |
|---|---|---|---|
| 6,507,866 B1 | 1/2003 | Barchi | |
| 6,735,701 B1 | 5/2004 | Jacobson | |
| 6,829,613 B1* | 12/2004 | Liddy | 707/694 |
| 7,124,438 B2 | 10/2006 | Judge et al. | |
| 7,467,202 B2* | 12/2008 | Savchuk | 709/224 |
| 7,822,701 B2* | 10/2010 | Carter et al. | 706/55 |
| 2004/0054677 A1* | 3/2004 | Mueller et al. | 707/100 |
| 2005/0086252 A1 | 4/2005 | Jones et al. | |
| 2005/0091532 A1 | 4/2005 | Moghe | |
| 2006/0015563 A1 | 1/2006 | Judge et al. | |
| 2007/0028297 A1 | 2/2007 | Troyansky et al. | |
| 2007/0113292 A1* | 5/2007 | Kao et al. | 726/27 |
| 2007/0130077 A1 | 6/2007 | Jagadeesan et al. | |
| 2007/0157123 A1* | 7/2007 | Ikawa et al. | 715/816 |
| 2007/0192272 A1 | 8/2007 | Elfayoumy et al. | |
| 2007/0198420 A1 | 8/2007 | Goldstein | |
| 2008/0016020 A1 | 1/2008 | Estes | |
| 2008/0021701 A1 | 1/2008 | Bobick et al. | |
| 2010/0257141 A1* | 10/2010 | Monet et al. | 707/665 |

FOREIGN PATENT DOCUMENTS

WO    WO-2006/088952 A2    8/2006

\* cited by examiner

*Primary Examiner* — Matthew Sked
(74) *Attorney, Agent, or Firm* — Venable LLP; Jeffri A. Kaminski

(57) ABSTRACT

A system for generating a lexicon of words, organized into weighted categories, from a user defined set of example documents for detecting suspicious e-mails from a mail archive is provided. The system uses a set of example documents and e-mails given by the user to probabilistically find possible lists of critical words. The obtained list is now applied on an archive of e-mails. The system generates an inverted index on the mails from the archive to facilitate search for the key phrases. User feedback is taken on the results obtained and corrections in the lexicon made if necessary. Thus, the mails are scanned based on user feedback, user defined words and automatically generated word list. These lists constantly adapt as e-mails in the archive change. The system then combines all these to present the user with several possible sets of keywords and their relative importance that can be used as a policy for a desired level of accuracy. The system also shows the user any change if the set is modified. Finally, the system searches through the entire mail archive to find suspicious e-mails.

6 Claims, 5 Drawing Sheets

AUTOMATIC LEXICON GENERATION SYSTEM FOR DETECTION OF SUSPICIOUS E-MAILS FROM A MAIL ARCHIVE

CROSS REFERENCE TO RELATED APPLICATION

This application claims priority of the Indian Application No. 2071/CHE/08 filed on Aug. 26, 2008, which is incorporated by reference.

FIELD OF INVENTION

The present invention relates generally to an automatic lexicon generation system for detection of suspicious e-mails in a mail archive. More particularly, the present invention pertains to the field of information leakage detection and electronic mail security. The invention describes a system for detecting malicious e-mails from an archive using user feedback and creation of relevant lexicon by extracting important keywords automatically. Here, a lexicon defines a set of words together with their respective relative weights describing a specific category of documents. These keywords and their combinations are then presented to the user as possible accurate policy descriptions. User can select a set; refine the same for use as part of the e-mail filtering policy applicable over the mail archive. The system uses a set of example documents given by the user to probabilistically find possible list of critical words. The obtained list is now applied on an archive of e-mails. If needed, this list can be combined with any user defined list of words. User feedback is taken on the results obtained and corrections in the lexicon made if necessary. The system then presents the user with several possible sets of keywords and their relative importance that can be used as a policy for a desired level of accuracy. These lists constantly adapt as e-mails in the archive change. The system also shows the user any change if the set is modified. The final approved list is stored as a weighted category lexicon. Finally, the system searches through the entire database and finds suspicious e-mails.

BACKGROUND OF THE INVENTION AND PRIOR ART REFERENCES

U.S. Pat. No. 7,124,438, "Systems and methods for anomaly detection in patterns of monitored communications", Paul Judge et al, Issue date: Oct. 17, 2006.

U.S. Pat. No. 6,507,866, "E-mail usage pattern detection", Ronald Barchi, Issue date: Jan. 14, 2003.

U.S. Pat. No. 6,735,701, "Network policy management and effectiveness system", Andrea M. Jacobson, Issue date: May 11, 2004.

U.S. patent application Ser. No. 11/347,463, "Method and a System for Outbound Content Security in Computer Networks", Leonid Goldstein, Publication date: Aug. 23, 2007.

U.S. patent application Ser. No. 10/892,615, "Method and Apparatus for Creating an Information Security Policy Based on a Pre-configured Template.", Chris Jones et. al., Publication date: Apr. 21, 2005.

U.S. patent application Ser. No. 11/485,537, "Methods and System for Information Leak Prevention", Lidror Troyansky et al. Publication date: Feb. 1, 2007.

US Patent application number: PCT/US2006/005317, "Methods and Apparatus for Handling Messages containing Pre-selected data", Vontu Inc., Publication date: Aug. 24, 2006.

U.S. patent application Ser. No. 11/173,941, "Message Profiling Systems and Methods", Paul Judge et. al., Publication date: Jan. 19, 2006.

U.S. patent application Ser. No. 11/284,666, "Adaptive System for Content Monitoring", Ramanathan Jagadeesan et. al., Publication date: Jun. 7, 2007.

U.S. patent application Ser. No. 10/780,252, "Method and Apparatus to detect Unauthorized Information Disclosure via Content Anomaly Detection", Pratyush Moghe, Publication date: Apr. 28, 2005.

U.S. patent application Ser. No. 11/761,839, "Techniques for Creating Computer Generated Notes", Bobick, Mark and Wimmer, Carl, Publication Date: Jan. 24, 2008.

U.S. patent application Ser. No. 11/781,419, "Knowledge Discovery Agent System and Method", Estes, Timothy W., Publication Date: Jan. 17, 2008.

U.S. patent application Ser. No. 11/656,017, "Method and computer program product for converting ontologies into concept semantic networks", Elfayoumy, Sherif A., and Mohan, Rengaswamy, Publication Date: Aug. 16, 2007.

Prior art considers the problem of information leakage as a content inspection and detection problem. These techniques look at the content of e-mails and try to determine if any sensitive information is being leaked out. Prior art also had looked at pattern anomaly detection, but that too was done from the content scanning perspective using pre-defined regular expressions or keywords, pre-determined policies, or information depending on the number and frequency of mails between senders and recipients. Thus, the outbound e-mail contents were read and information about these contents was then used to identify information leakage. For example, if the mail content contained specific keywords, a leakage was detected. Or, if some mails seemed to have certain words that are not usually the kind used by the sender, that mail will be flagged as an anomaly.

In some cases, both the sender and recipient information together with the time of sending and the frequency of mails were used. However, all of these techniques rely on word lists and key phrases, either pre-defined or found using frequency analysis.

None of these techniques present the user with a well-defined and friendly way of sifting through a set of possible words to match a desired level of accuracy. No existing invention utilizes user feedback in mail analysis to provide the user with several alternative word schemes which can generate a chosen level of accuracy on a set of e-mails.

SUMMARY OF INVENTION

This is an innovative system for e-mail forensics identifying e-mails disclosing critical or sensitive or confidential data. This automatic system extracts Important key phrases and words dynamically. The relative importances of these extracted key phrases are deduced, and weights are assigned to these words. This list of key phrases together with the relative weights defines a fingerprint of the category of documents under consideration. This weighted list is called a weighted category lexicon, which is then used to filter the archive. The automatic system relies on two different inputs. The first is a set of example important documents shown by the user, and and the second is example e-mails. The system takes the following steps. All common words are removed from the result set. Each document is then analyzed for relative frequencies of words. From these, a set of words is chosen as a candidate set using probabilistic techniques. Based on this, sets of possible relevant phrases and their relative importance to achieve a desired level of detection accuracy are computed and presented to the user for a possible scrutiny. The user can modify, accept or delete any list, and can see the changes getting reflected immediately. The selected list is fed into an e-mail filtering policy tool for identifying possible information leakage. This list is then used on the entire database to find suspicious e-mails.

Our invention has the following unique features not available in prior art:
1. Our system first identifies a large set of possibly important key phrases. Weights are then assigned to each member of this set. This set is further re-examined with respect to the accuracy of classification. Key phrases and weights are re-shuffled and smaller sets identified till the accuracy level is met. Thus, an iterative screening of the key phrases and weights are done till accuracy levels specified by the user are met. No prior tool does this.
2. Our system builds several alternate set of possible key phrases and weights which may give the user similar accuracies. This is a very special feature which gives the user multiple options and not a rigid, fixed set. Therefore, the system acts intelligently and gives the user several possible options.
3. The user can simulate the effect of any modification, addition, deletion or mixture of these word sets, thereby getting a visual aid for selecting the final words for the policy. This is a unique feature not available in any prior art. This gives the user flexibility and option to use own judgement together with the system's intelligence. The system learns the modifications done by the user and uses that for detection of fraudulent e-mails. This list of key phrases together with the relative weights defines a fingerprint of the category of documents under consideration. This weighted list is called a weighted category lexicon, which can now be used on any e-mail archive.

In a preferred embodiment, the present invention provides an automatic lexicon generation system to identify and construct a list of English phrases from a user specified set of example e-mails and documents written in English, said phrases being a set of relevant key phrases useful for identifying information leak in an archive of e-mails, said system comprises: means to identify a set of Important key phrases from a user specified set of example e-mails leaking information and documents leaking information, written in English, using frequency analysis, word stemming, and removal of common and domain specific words; means to identify a set of important key phrases from a user specified set of example e-mails not leaking information and documents not leaking information, written in English, using frequency analysis, word stemming, and removal of common words; means to identify a set of relevant phrases and to assign a label, one of "very highly sensitive", "highly sensitive", "sensitive" "not sensitive" or "safe" to each of the phrases of set; means for assigning weights to each of said key phrases; means for building multiple key phrase lists and weights from said important key phrases; means for presenting said lists of key phrases to the user for simulation; means for storing the final approved list as weighted category lexicon; and means for using said list of phrases on an archive of e-mails and documents written in English for identifying any e-mail leaking information.

The means for identifying the important key phrases from a user specified set of documents leaking information and e-mails leaking information and documents not leaking information and e-mails not leaking information written in English further comprises: means of accepting a set of English documents from the user; means of accepting some parts of the documents as critical or not critical; means of accepting a set of English e-mails from the user; means of accepting some parts of the e-mails as critical or not critical; means of rejecting common and domain specific words; means for stemming words; means for creating a frequency table of the words; and means for identifying words from said frequency table which occur with higher frequency only in documents or e-mails leaking information and with higher frequency only in documents or e-mails not leaking information and assigning a label, one of "very highly sensitive", "highly sensitive", "sensitive", "not sensitive" or "safe" to said identified words.

The means of assigning weights to identify the important key phrases further comprises: means for finding ratios of frequencies of said important key phrases and classifying them according to some preset norms; means for sorting said important key phrases according to said ratios; and means for assigning weights proportional to the ratios spread over a pre-defined range.

The means of finding multiple key phrase list and weights further comprises: means for merging the key phrases and weights obtained into alternate lists.

The means of presenting the lists to the user for simulation further comprises: means for displaying the lists to the user together with controls so the user can modify, delete, change or add to the lists at the user's discretion and can simulate the effect of such lists on a pre-defined set of mails; and means for storing the final approved list of key phrases and their weights as a weighted category lexicon.

The means of identifying e-mails leaking information from an archive of e-mail and documents written in English further comprises: means for scanning the e-mails and documents in the archive for the phrases in the list of important phrases; means for building an inverted index for each of the phrases for each of the documents and e-mails; and means for classifying an e-mail as leaking information if said score crosses a threshold.

DETAILED DESCRIPTION

Figure 1:
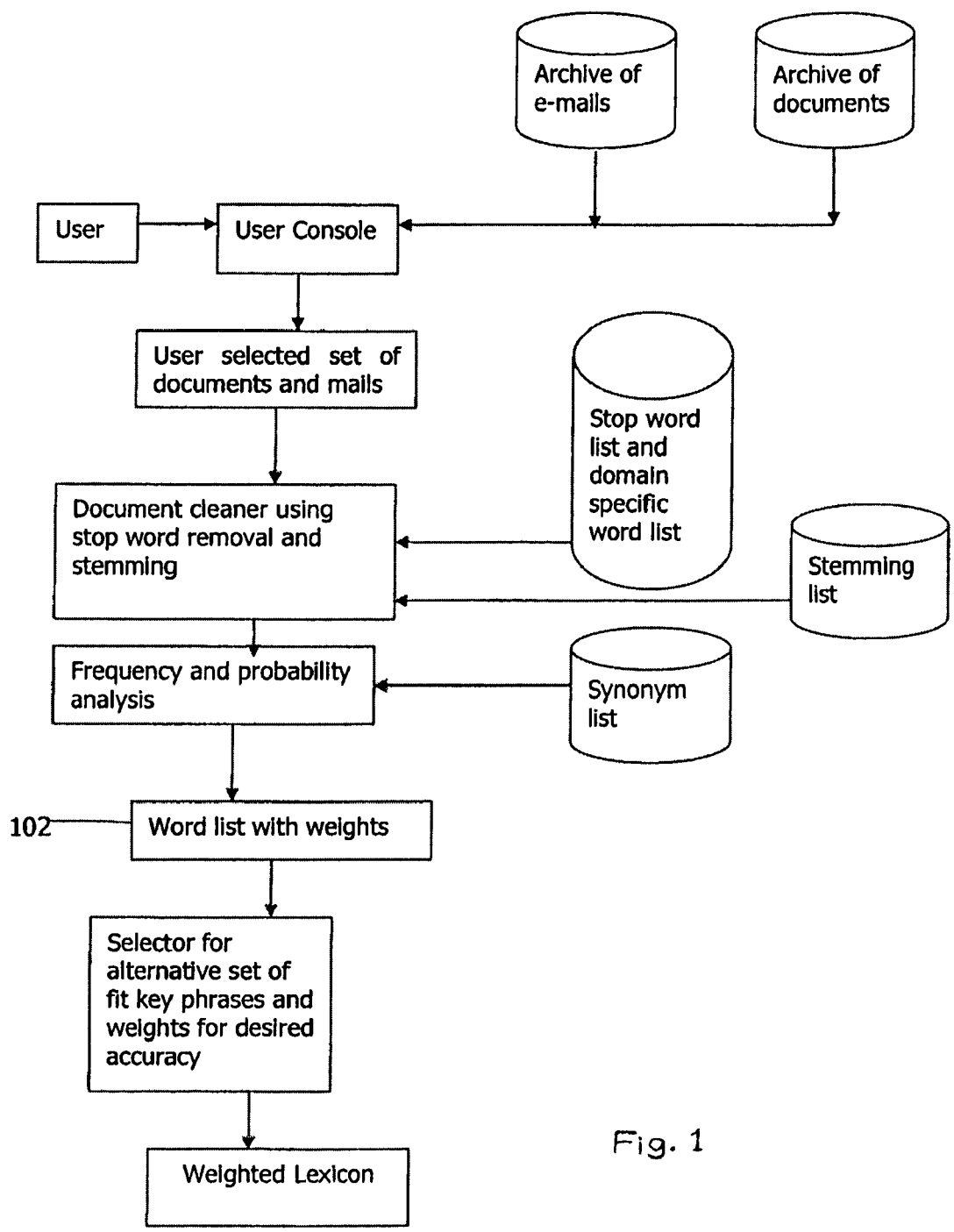
FIG. 1: System diagram of the new key phrase generation system
Figure 2:
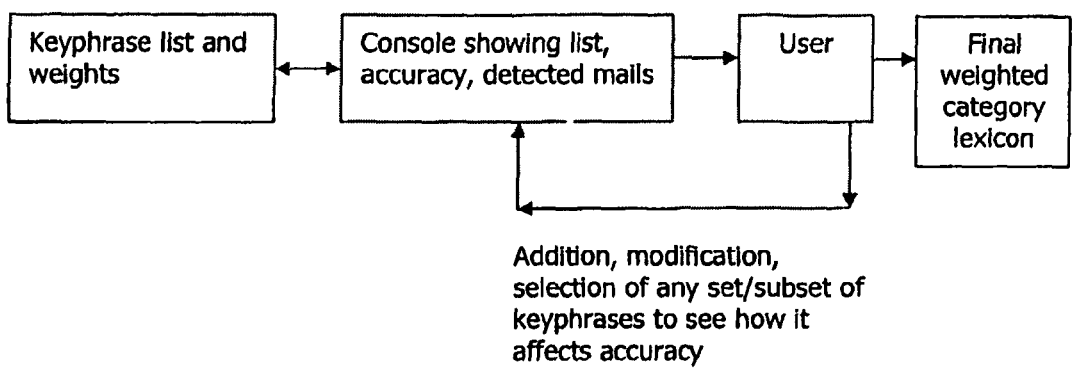
FIG. 2: Block diagram for user interaction with key phrase list system
Figure 3:
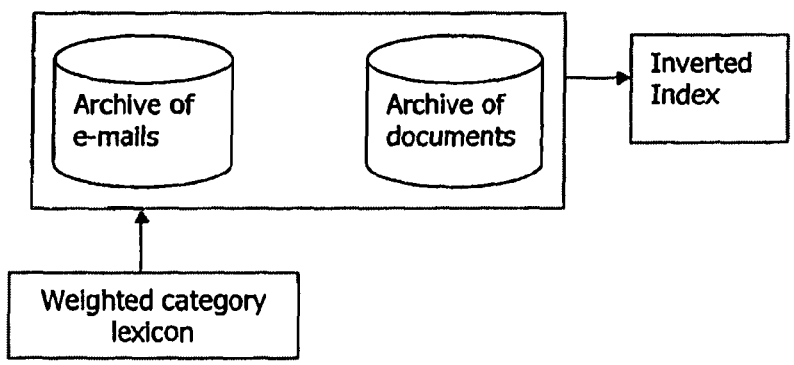
FIG. 3: Block diagram of the Indexing Engine

Industrial espionage, stock market information leakage and sensitive news leaking out to the competition are all too common since time immemorial. With the advent of e-mails, this has become an even more pressing problem. Quite often, the mail volume from a company is huge, making manual monitoring impossible.

Thus, it has become quite common to have an e-mail filter in place. In such an e-mail filter, the user or organization defines a policy, that is, a set of keywords and rules through which the e-mails pass and get filtered. Evidently, the set of keywords is an extremely important component of such a filtering policy. Choice of wrong words can lead to high false positives or false negatives.

It may seem that building this word list manually is the best idea. However, there are practical disadvantages. First, it needs a lot of time and deep expertise in almost all areas of an organization to be able to pick up the most efficient set of words for the policies. Second, the words need not be static. With change in the focus of the company, or with short term events, the importance of words may change. As an example, the words "minutes of the meeting" may be important only within a specific time band around a meeting. For these reasons, it can get very costly and very inefficient to build such a list purely manually.

The list of critical words is not enough. To be able to effectively use a list of such words on a very large database, one must have an efficient means of building an index of documents containing such words. This inverted index should be built dynamically, considering the fact that the list of words may change fast depending on the content and focus of the e-mails. Thus, the inverted index building engine must continuously read the list and build the index in parallel.

The present invention is a system that tries to tackle both these problems. Instead of relying on the user's correctness of choosing words, the system relies on the correctness of user's judgment about a sensitive document or a sensitive e-mail. Evidently, this is easier, more accurate and more efficient for the user.

Thus, the user only points out a set of sensitive documents and/or e-mail to the system. The system then tries to define the word list on its own.

The system also has a hardware tool that can read this list dynamically and build the inverted index fast, based only on the changes in the list. Thus, any change in the list is immediately reflected in the index and the detection in the archive is always up-to-date.

In our system, we identify and use only a small subset of all uncommon words to accurately classify the input mails. This needs a novel, dynamic method of choosing subsets of important words from a larger set. Also, our system employs a novel, dynamic method to re-assign weights to the words to iterate over the classification till a specified level of accuracy is obtained.

The fundamentally new aspect of this invention is the following. Our system first identifies a large set of possibly important key phrases. Weights are then assigned to each member of this set. This set is further re-examined with respect to the accuracy of classification. Key phrases and weights are re-shuffled and smaller sets identified till the accuracy level is met. However, we go much beyond this. Besides iteratively picking up important words together with weights, we build several alternate set of possible key phrases and weights which may give the user similar accuracies. The user can now simulate the effect of any modifications, additions, deletions or mixture of these word sets, thereby getting a visual aid for selecting the final words for the policy. This list of key phrases together with the relative weights defines a fingerprint of the category of documents under consideration. This weighted list is called a weighted category lexicon, which can now be used on any e-mail archive. Thus, the sequence followed by all existing systems (see prior art citations) is as follows:

Item 1: Get example set of good and sensitive documents.
Item 2: Remove commonly occurring words and domain specific words, if any from the documents.
Item 3: Analyze the content of the examples using frequency analysis and choose words which come out of this analysis.
Item 4: Extract same words from flowing digital traffic and arrive at a decision about the traffic.

In our invention, we add three new steps between items 3 and 4.

Item 3a: Reduce/enrich the set of words found in step 3 by applying the set of words on a set of example documents and build multiple lists which all seem to give similar accuracies.

Item 4a. Send the lists built in step 3a to the user through a visual simulator where the user can see the effect of modifying the lists instantaneously, or can mix and match the lists to finally choose one set.

Item 5a: Send the lists built in step 4a to an inverted index building hardware that can dynamically build the index for only the changed part of the list efficiently.

Thus, the set of words found after step 3a in our invention is much richer, and also more precise. Also, because the words are always indexed, the search is always fast and efficient.

Figure 4:
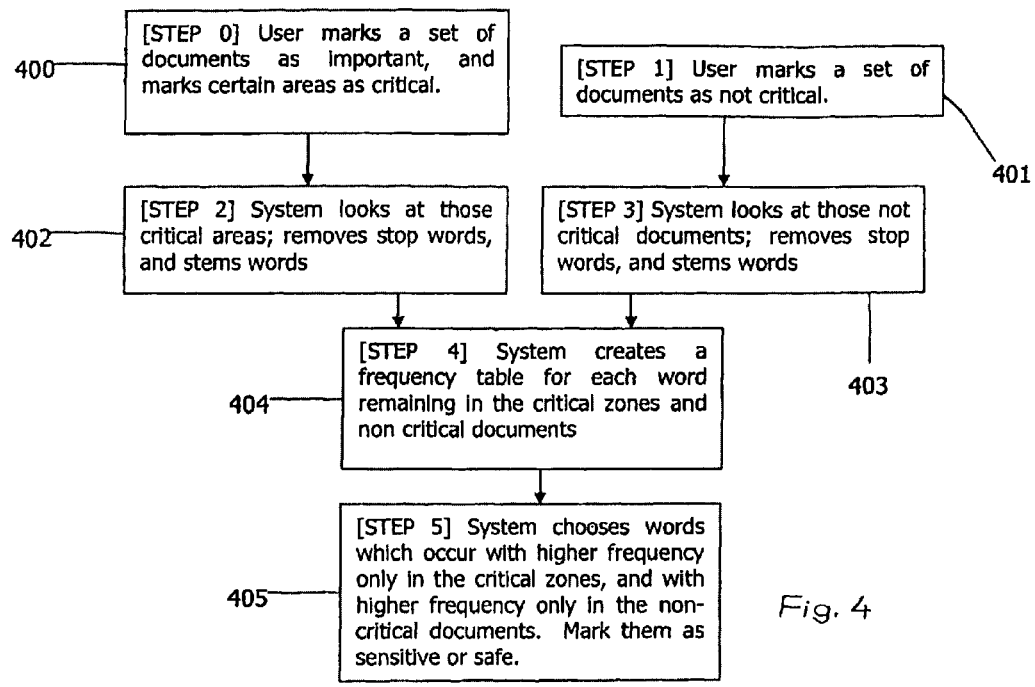
FIG. 4: Flowchart of the action where important words are extracted using frequency analysis from a set of example documents shown by user

We will describe our system in steps. The first six steps of the process are illustrated in FIG. 4. These are described below.

[STEP 0] User shows a sample set of critical documents, and labels them according to the degree of sensitivity as "Very Highly Sensitive", "Highly Sensitive", "Sensitive". S(h)e may also mark certain areas of the documents as critical.

[STEP 1] User shows a sample set of non-critical documents, and labels them according to the degree of sensitivity as "Not very sensitive", "Not sensitive" and "Safe". S(h)e may also mark certain areas of the documents as non-critical.

[STEP 2] The critical areas as shown in [STEP 0] are subjected to analysis and all commonly occurring words (stop words) and domain specific words (words which are not stop words but common to the domain of e-mails being shows) are removed. On this set, stemming is done, that is, all words are reduced to their basic singular and infinitive structures (e.g., "words" reduces to "word", "going" reduces to "go").

[STEP 3] The same are performed on the non-critical documents and areas.

[STEP 4] For every reduced word, a frequency table is created. This table shows how many times each word occurs in which type of area ("Very Highly Sensitive", "Highly Sensitive", "Sensitive", "Not sensitive", "Safe"). Such table is also formed for two word and three word groups.

[STEP 5] Only those words are chosen which seem to have enough discriminating power, that is, occur highly in critical documents but not in non-critical documents and vice versa. This is found in the following way:

For every word
Add the frequencies for ("Very Highly Sensitive", "Highly Sensitive", "Sensitive"), call it f1.
Add the frequencies of ("Not sensitive", "Safe"), call it f2.
If word belongs exclusively to one of the groups, the word is termed with the same group name.
Thus, if a word belongs exclusively to "Very Highly Sensitive" group, the word is termed as "Very Highly Sensitive" and so on.
else
Find the ratio f1/f2.
If ratio is greater than a pre-defined threshold, the word is termed as "critical", and if it is lower than a pre-defined threshold, the word is termed as "non-critical".
Select the set of "very highly sensitive", "highly sensitive", "sensitive" "non-sensitive", "safe", "critical" and "non-critical" words.

For every "critical" word

Find its frequency in each type of area ("Very Highly Sensitive", "Highly Sensitive", "Sensitive"), say f1, f2 and f3

Find the ratios $r1=f1/(f1+f2+f3)$, $r2=f2/(f1+f2+f3)$ and $r3=f3/(f1+f2+f3)$

If r1>a pre-defined threshold, mark this word as a "very highly sensitive word". Similarly, if r2>A pre-defined threshold, mark this word as a "highly sensitive word" and if r3>a pre-defined threshold, mark this word as a "sensitive word". If more than one of r1, r2 and r3 exceed threshold, the largest of them is chosen.

Multiply the finally chosen ratio by the fraction (d/D) where d is the number of documents of the group where the word appears, and D is the total number of documents in the group. For example, if a word is marked as "very highly sensitive word", then r1 is multiplied by (d/D) where d is the number of documents in very highly sensitive group in which the word appears, and D is the total number of documents in very highly sensitive group.

Sort all "very highly sensitive words" according to the multiplied ratio values

Sort all "highly sensitive words" according to the multiplied ratio values

Sort all "sensitive words" according to the multiplied ratio values

Assign a weight between 10 and 8 (proportional to the multiplied ratio values) to the very highly sensitive words Assign a weight between 8 and 5 (proportional to the multiplied ratios) to the highly sensitive words Assign a weight between 5 and 0 (proportional to the multiplied ratios) to the sensitive words For every "non-critical" word Find its frequency in each type of area ("Not sensitive", "Safe"), say f4, and f5

Find the ratios $r4=f4/(f4+f5)$, $r5=f5/(f4+f5)$

If r4>a pre-defined threshold, mark this word as a "not sensitive". Similarly, if r5>a pre-defined threshold, mark this word as a "safe word". If both r4 and r5 exceed threshold, the larger of the two is chosen.

Multiply the chosen ratio by the fraction (d/D) where d is the number of documents of the group where the word appears, and D is the total number of documents in the group. For example, if a word is marked as "not sensitive word", then r4 is multiplied by (d/D) where d is the number of documents in not sensitive group in which the word appears, and D is the total number of documents in not sensitive group.

Sort all "not sensitive words" according to the multiplied ratio values

Sort all "safe words" according to the multiplied ratio values

Figure 5:
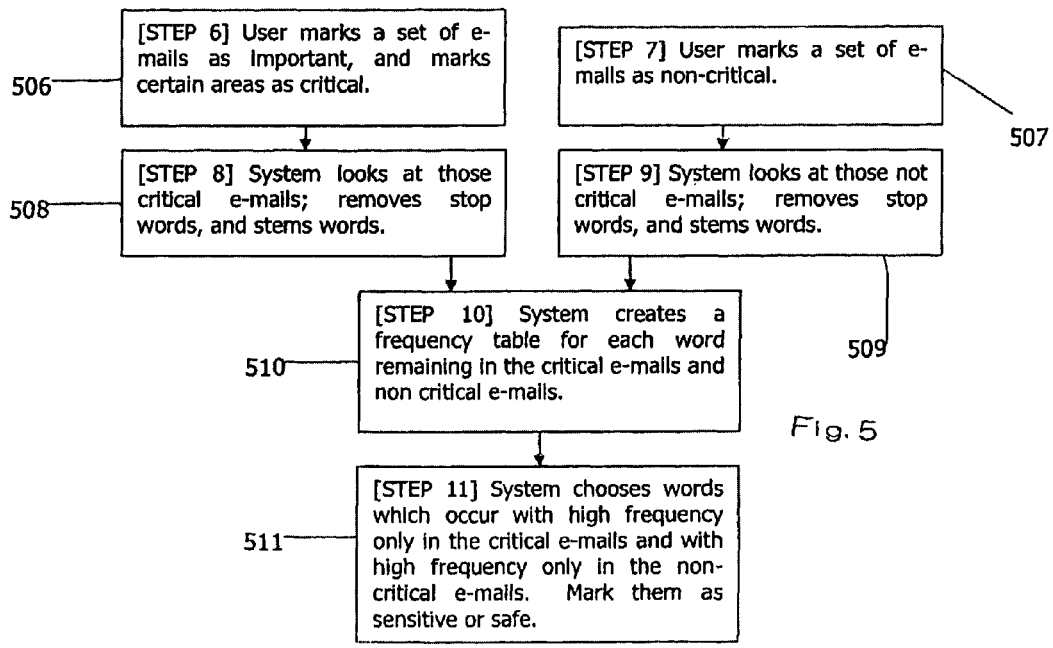
FIG. 5: Flow diagram of the system where important words are extracted using frequency analysis from a set of example e-mails shown by user.

Assign a weight between −10 and −5 (proportional to the multiplied ratio values) to the safe words Assign a weight between −5 and 0 (proportional to the multiplied ratios) to the not sensitive words Steps 6 to 11 are exactly similar to steps 0 to 5, except that they are performed on a set of example e-mails. These are shown in FIG. 5 (Steps 6 to 11).

Figure 6:
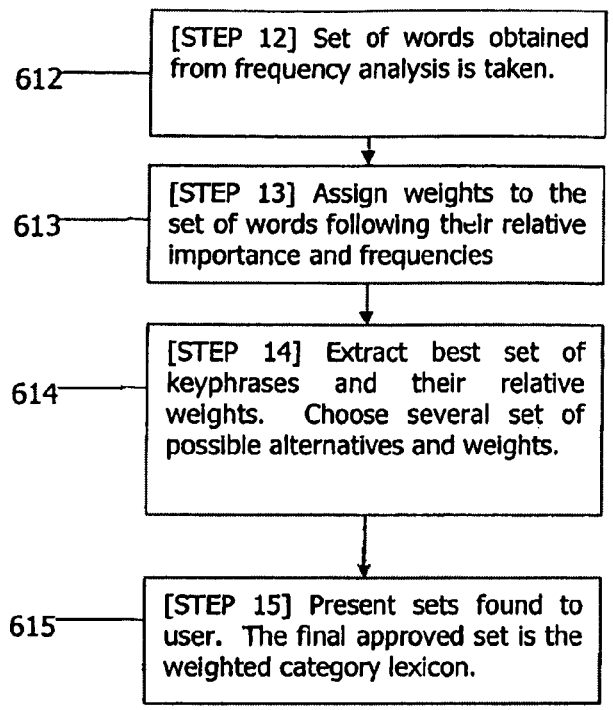
FIG. 6: Flow chart which shows the generation of the final sets of key phrases.

FIG. 6 shows the inventive part of this system. In this figure, we describe the processing steps performed on the words obtained from steps 5 and 11.

[STEP 12] First, the list obtained from steps 5 and 11 is taken.

[STEP 13] For each word in the word list, a weight is assigned to the word. This is done in the way described above.

[STEP 14] Combine the words and weights from step 13 to form multiple possible word lists. In this list, words with higher ratios get higher priority. Select top few words with their weights and calculate score for mails. If scores match user feedback, stop, save this list and start with a new set. If scores do not match, alter this list according to the need (for example, if score need to reduce, delete high weight words; if score needs to increase, add high weight words) and redo the process till desired level of accuracy is obtained.

[STEP 15] Present these lists to the user for modification and simulation. The final approved list is the weighted category lexicon.

Figure 7:
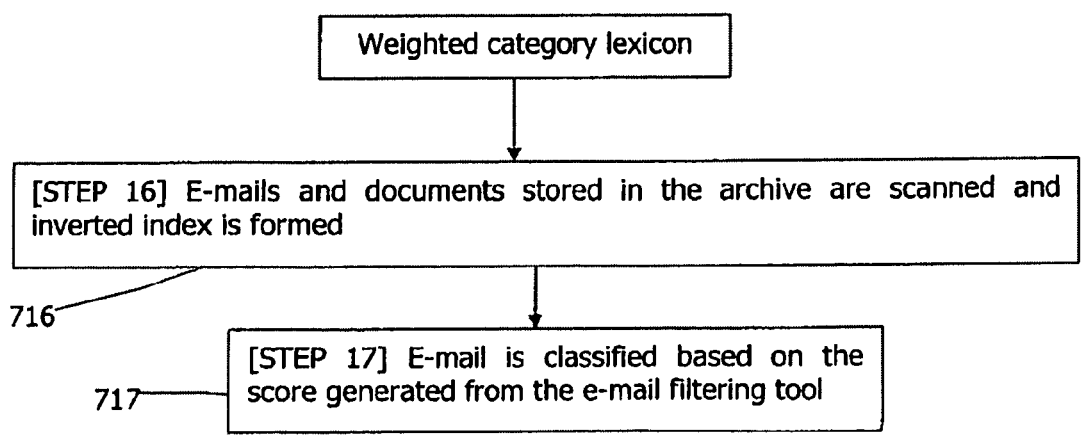
FIG. 7: Flow diagram which shows the use of the obtained word list in an e-mail filtering policy.
Figure 8:
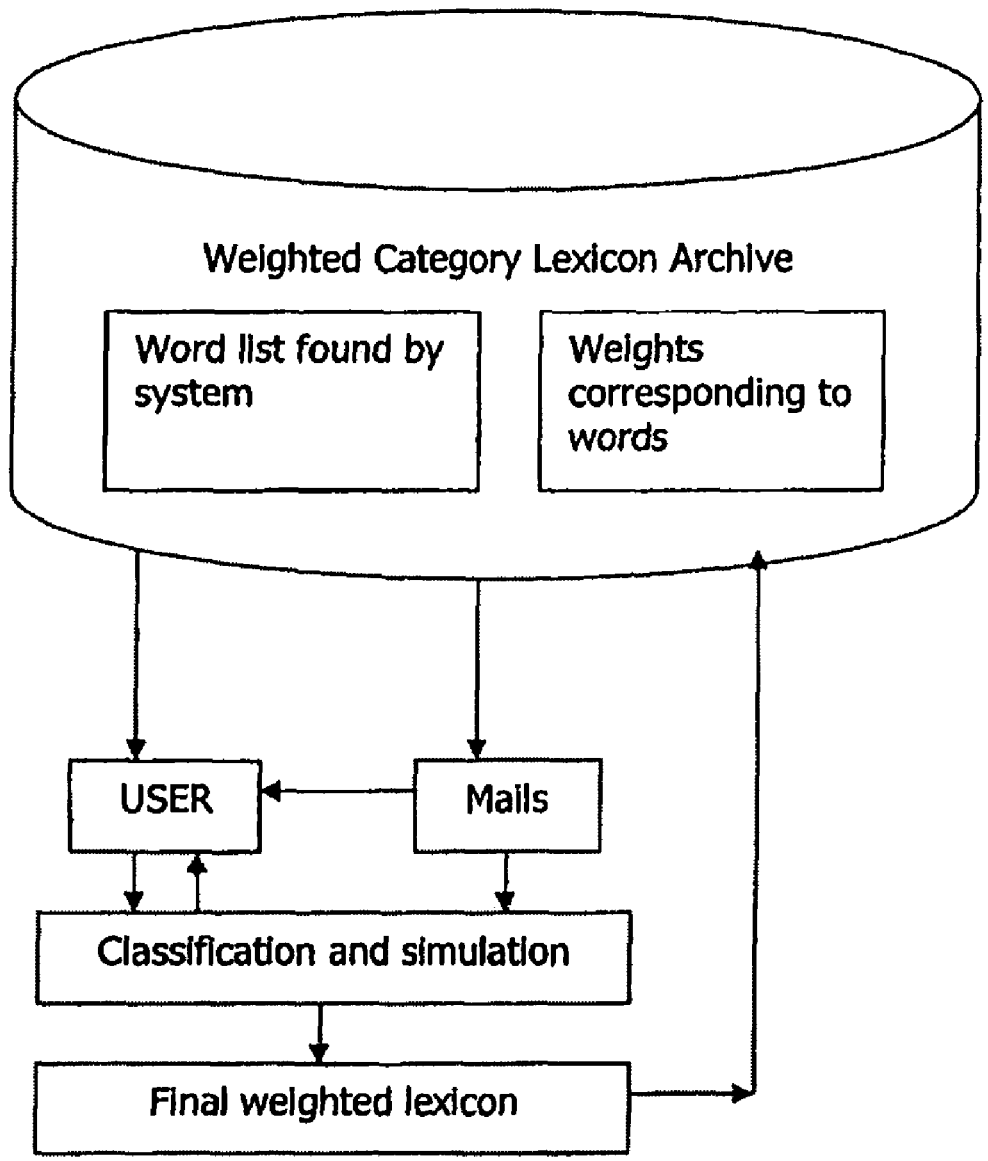
FIG. 8: System diagram of weighted category lexicon and its use for accurate classification.

How this word list is used in a real e-mail filtering policy is shown in FIG. 7.

[STEP 16] In an archive of e-mail, from each e-mail, the words from the world list are extracted together with their positions in the mail and/or the attachment document.

[STEP 17] From the words' weights, the e-mails' score is generated and it is either classified as clean or suspect.

What is claimed is:

1. An automatic lexicon generation system to identify an information leak in an archive of e-mails, said system comprises:

a database;

a user console; and a hardware tool in communication with the user console and configured to perform the following:

receive a set of example e-mails leaking information and documents leaking information via the user console wherein, portions of the e-mails leaking information and documents leaking information are identified as critical or not critical;

identify a first set of important key phrases from the set of example e-mails leaking information and documents leaking information using frequency analysis, word stemming, and removal of common words and domain specific words based on the identified critical or not critical portions of the e-mails leaking information and documents leaking information;

receive a set of example e-mails not leaking information and documents not leaking information via the user console;

identify a second set of important key phrases from the set of example e-mails not leaking information and documents not leaking information using frequency analysis, word stemming, and removal of common words;

create a set of relevant phrases based on the first set of important key phrases and the second set of important key phrases;

create a frequency table of the relevant phrases;

identify words from the frequency table which occur with higher frequency in documents or e-mails leaking information and with higher frequency in documents or e-mails not leaking information and assign a label of "very highly sensitive", "highly sensitive", "sensitive", "not sensitive", "safe", or "sensitive" to each of the phrases of said set of relevant phrases;

assign weights to each of said relevant phrases;

build multiple key phrase lists and weights from said relevant phrases;

display said multiple key phrase lists on the user console for simulation;

receive approval of said multiple key phrase lists from the user console;

store the approved said multiple key phrase lists as weighted category lexicon in the database; and apply said multiple key phrase lists on an archive of e-mails and documents for identifying any e-mail leaking information.

2. The system as claimed in claim 1, wherein said assign weights to each of said relevant phrases further comprises:
   finding ratios of frequencies of said important key phrases and classifying them according to some preset norms;
   sorting said important key phrases according to said ratios; and
   assigning weights proportional to the ratios spread over a pre-defined range.

3. The system as claimed in claim 1, wherein said build multiple key phrase list and weights further comprises:
   merging the key phrases and weights into alternate lists.

4. The system as claimed in claim 1, wherein said display said multiple key phrase lists on the user console for simulation further comprises:
   displaying the lists together with controls so that a user can modify, delete, change or add to the lists at the user's discretion and can simulate the effect of such lists on a pre-defined set of mails and the final approved list can be stored as weighted category lexicon.

5. The system of claim 1, wherein said identifying e-mails leaking information from the archive of e-mail and documents further comprises:
   scanning the e-mails and documents in the archive for phrases in said multiple key phrase lists;
   building an inverted index for each of the phrases for each of the documents and e-mails; and
   classifying an e-mail as leaking information if said score crosses a threshold.

6. A method of detecting suspicious documents from an archive comprising:
   receiving via a user console a plurality of example e-mails leaking information and documents leaking information via the user console wherein, portions of the e-mails leaking information and documents leaking information are indicated as critical or not critical;
   identifying, by a hardware tool, a first set of important key phrases from the plurality of example e-mails leaking information and documents leaking information using frequency analysis, word stemming, and removal of common words and domain specific words, wherein the identifying is based on the critical or not critical indications of the e-mails leaking information and documents;
   receiving a plurality of example e-mails not leaking information and documents not leaking information via the user console;
   identifying a second set of important key phrases from the plurality of example e-mails not leaking information and documents not leaking information using frequency analysis, word stemming, and removal of common words by the hardware tool;
   creating a set of relevant phrases based on the first set of important key phrases and the second set of important key phrases by the hardware tool;
   creating a frequency table of the relevant phrases by the hardware tool;
   identifying words from the frequency table which occur with higher frequency in documents or e-mails leaking information and with higher frequency in documents or e-mails not leaking information by the hardware tool;
   assigning one of "very highly sensitive," "highly sensitive," "sensitive," "not sensitive," "safe," or "sensitive" to the phrases of the set of relevant phrases based on the words from the frequency table which occur with higher frequency in documents or e-mails leaking information and with higher frequency in documents or e-mails not leaking information by the hardware tool;
   assigning weights to the relevant phrases after assigning a label by the hardware tool;
   building multiple key phrase lists and weights from the relevant phrases by the hardware tool;
   displaying the multiple key phrase lists on the user console;
   receiving from the user console an indication of at least one of a modification, a deletion, or an addition to the multiple key phrase lists and creating modified multiple key phrase lists;
   simulating the effect of the indication of at least one of the modification, the deletion, or the addition to the multiple key phrase lists on a pre-defined set of emails by the hardware tool;
   receiving approval of the indication from the user console;
   modifying the multiple key phrase lists based on the received indication from the user console;
   storing the multiple key phrase lists as a weighted category lexicon by the hardware tool; and
   applying the multiple key phrase lists on an archive of e-mails and documents for identifying any e-mail leaking information by the hardware tool.

* * * * *